Sept. 17, 1929. A. SCHOELLER Re. 17,436

ELECTRIC CIGAR LIGHTER

Original Filed March 13, 1924

Inventor

Alfred Schoeller,

By James L. Norris

Attorney

Reissued Sept. 17, 1929

Re. 17,436

UNITED STATES PATENT OFFICE

ALFRED SCHOEELER, OF FRANKFORT-ON-THE-MAIN, GERMANY

ELECTRIC CIGAR LIGHTER

Original No. 1,570,286, dated January 19, 1926, Serial No. 698,911, filed March 13, 1924. Application for reissue filed January 11, 1928. Serial No. 246,065.

This invention relates to an electric cigar lighter with removable heating wire carrier, the heating wire being of such dimension that it can be sufficiently loaded with heat in order to permit of using the lighter separately from the source of current. The known devices of this type are composed of a great number of parts, they are consequently expensive and not very secure in working or the heating body is not visible from the outside so that an unnecessary overheating takes place.

One object of the invention is the provision of a supporting base having terminal connections and a bodily removable heating and lighting unit, movable into and out of engagement with the base by a sliding movement in a plane parallel to the outer face of the base and preferably from above, whereby the two cooperate to hold the unit assembled within the base so that they cannot readily become disassembled through jars or accidentally, thus making the device a very desirable one for use in motor cars.

Another object of this invention is the provision of a cigar lighter having a support and a detachable unit-carrying member, each of which is provided with an axial terminal and one of which terminals is spring-tensioned to assist in holding the members interengaged and against accidental displacement.

Another object of this invention is the provision of an open, shallow, bowl-shaped igniting unit-carrying member in which the glow of the unit, when energized, is readily observed and which, due to the surface area of the unit and the manner of mounting, will retain said glow sufficiently long after the carrier is removed from the base to permit the lighting therefrom of several cigarettes or cigars, thus making the device especially desirable when more than one passenger in a motor vehicle desires to smoke.

According to the invention, a flat box-shaped heating wire carrier is removably mounted in a frame which leaves the heating body visible from the outside, the carrier being clamped in its position by means of a spring which serves at the same time as a current bridge.

An embodiment of the invention is shown, by way of example, on the accompanying drawing, in which.

Figure 1:
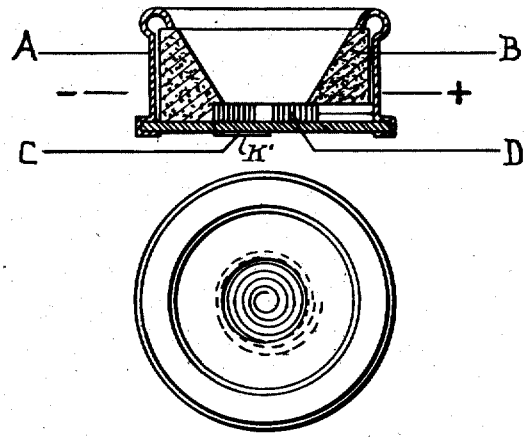
Fig. 1 shows the electric ignition body in section and in front elevation.
Figure 2:
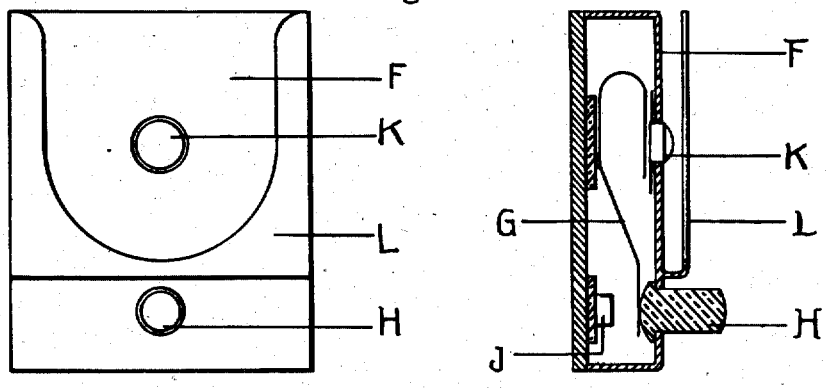
Fig. 2 shows in front elevation and in vertical section the switch which serves as current supplying socle.
Figure 3:
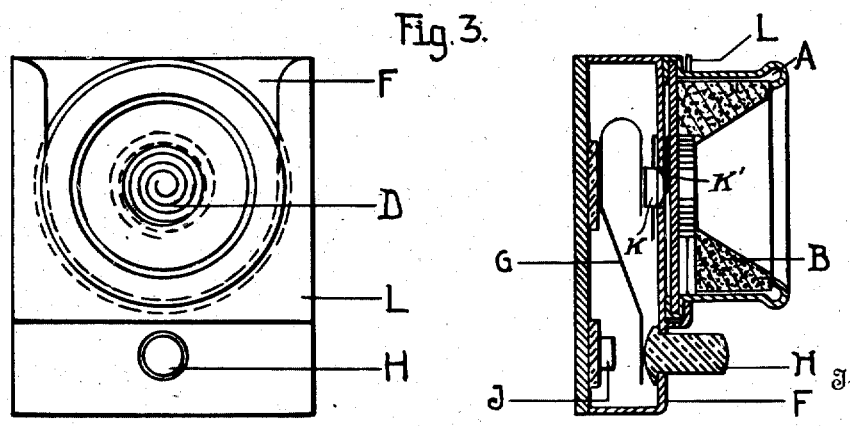
Fig. 3 shows in front elevation and in vertical section the ignition body inserted in the switch-socle.

A is the casing for the cylindrical box-shaped heating wire carrier or bowl and of which the side wall is formed of electric conducting material. B is the heat insulating mass and D is the heating spiral. The carrier or bowl A is open at its forward end and the heat insulating mass B tapers from said open end toward the rear end of the carrier or bowl. The heating spiral D is located at the rear end of carrier or bowl A and thus not only is visible through the open forward end of the carrier or bowl when the carrier or bowl is in place on the contact casing but may also be brought into contact with the end of a cigar or cigarette to be lighted when the carrier or bowl is removed from the contact casing and such end of a cigar or cigarette is inserted in said opening. C is a bottom plate formed of non-conductive material and designed to insulate the heating spiral. An electric contact K′ is carried by the rear wall of the cylindrical box-like casing A concentric with the side wall of the latter and is connected to one end of the heating spiral D. The other end of the heating spiral D is connected to the side wall of the casing A. F is the contact casing, formed of electric conducting material, for the box-shaped heating spiral carrier. L are bars of electric conducting material on the contact casing, which form a frame. K is a contact button of electric conducting material extending through the front wall of the contact casing but insulated from the latter and which serves for establishing the connection with the one pole of the current lead, the other pole being the mass of the casing. This contact button K is acted upon by a blade spring G carried by but insulated from the rear wall of the contact casing and which serves for securely holding the heating spiral carrier in the casing, the other end of said spring G serving to maintain the press button H normally in the switched out position. When the press button is pushed in it presses the lower end of said blade spring G against the contact plug J carried by but insulated from the rear wall of the casing whereby the circuit is closed. One pole of the current lead is connected to the mass of the contact casing F and the other pole is connected to the contact plug J.

The operation is as follows:—

The heating spiral carrier is inserted into the frame formed by the bars L and held in this position by the contact button K against the contact K′ of the heating spiral carrier A under the action of the spring G. If the press button H is pushed in the circuit is closed and current flows from the contact plug J through the spring G and the pressure contact K and contact K′ into the heating spiral and thence back through the casing. The heating spiral D being visible from the outside it can be seen at once when the heating spiral has been sufficiently heated whereupon the press button H is released. The heating spiral carrier can now be removed from the casing and used for igniting a cigar.

I claim:—

1. Electric lighter for cigars comprising in combination a heating spiral carrier in the form of a flat box, a contact casing, a guiding frame on said contact casing for holding said heating spiral carrier so that the heating spiral is visible from the outside, a pressure contact in the upper part of said casing, a press button in the lower part of said casing, a contact plug in the lower part of said casing opposite said push button and a blade spring fixed in said casing so that its upper end presses from behind against said pressure contact and its lower end against said push button, said blade spring serving as contact between said contact plug and said pressure contact when said push button is pushed in.

2. An electric cigar lighter, including a base and a detachable heat-unit-carrying member, cooperating electric terminals carried by the front face of said base and the rear face of said member and adapted to be engaged when the member is attached to the base, and cooperating circular attaching means carried by the base and member respectively, one of said attaching means having an opening in its periphery through which the other attaching means is insertable and removable by relative sliding movement of said base and heat-unit-carrying member in a plane parallel to the outer face of the base, the pressure between the terminals carried by said base and member, when said member is attached to the base, holding said supporting means in frictional engagement.

3. An electric cigar lighter, including a support having a pair of spaced terminals, a heat-unit-carrying member having terminals to contact with the terminals of the base, and cooperating circular attaching means carried by the support and member, respectively, one of said attaching means having an opening in its periphery through which the other attaching means is insertable and removable by relative sliding movement between said support and member in a plane parallel to the face of the support for securing said member to and detaching it from said support and moving the terminals of the base and member into and out of contact.

4. An electric cigar lighter including a support adapted to be held with its forward face in a substantially vertical plane and having on said face a central terminal and a terminal spaced from said central terminal, a heat-unit-carrying member having terminals to correspond to the terminals of the base, and cooperating circular attaching means carried by the support and member respectively, one of said attaching means having an opening in its periphery through which the other attaching means is insertable and removable by relative sliding movement of said member and support in a plane parallel to said face of the support.

5. An electric cigar lighter, including a base member, a substantially circular plug member, cooperating spaced electric terminals carried by said base and member, and substantially circular inter-engaging supporting means carried by the base and plug members, the supporting means of one of said members having an opening in its periphery through which the supporting means of the other member is insertable and removable, whereby movement of the plug parallel to the face of the base in one direction will cause engagement, and a like movement in the opposite direction will cause disengagement of said means, the terminals of said base and plug members being so arranged as to aline in any position of interengagement of said supporting means.

6. An electric cigar lighter, including a substantially circular base, a substantially circular plug, cooperating electric terminals carried by said base and plug, and cooperating concentric inter-engaging supporting means carried by the base and plug whereby movement of the plug in a parallel plane to the base in one direction will cause engagement, a like movement in the opposite direction causing disengagement, two of the coacting terminals being coaxial and the other coacting terminals being such as to engage when the coaxial terminals are in engagement, and one of said terminals being tensioned outwardly to normally hold the plug against accidental displacement.

7. An electric cigar lighter comprising a stationary base part; a removable carrier for a heating resistance; a heating resistance mounted upon the carrier so as to be visible from the front, said carrier and resistance forming a self-contained unit; an inwardly-extending guide flange at the sides and lower part of the front of the base part forming an open-fronted and open-topped socket; a flange at the rear end of the carrier unit adapted to be engaged behind the flange of the socket by a downward movement of the carrier unit parallel to the front face of the stationary base part, so that the carrier unit projects through the open front of the socket with the heating resistance visible from the front of the heater; electric contacts on the stationary base part; and co-operating contacts on the carrier unit for completing a circuit through the heating resistance.

8. An electric cigar lighter comprising a stationary base part; a removable carrier of flat circular form for a heating resistance; a heating resistance mounted on the carrier, said carrier and resistance forming a self-contained unit; an open-fronted and open-topped socket of semi-circular form on the front of the base part said socket having an inwardly-extending flange; a flange at the back of the circular carrier unit adapted to engage behind the flange of the socket by a downward movement of the carrier unit parallel to the front face of the stationary base part so that the carrier unit projects through the open front of the socket; electric contacts on the stationary base part; and co-operating contacts on the carrier unit for completing a circuit through the resistance, said contacts on the carrier unit being adapted to be engaged with the contacts on the base part when any portion of the circumference of the carrier unit is engaged with the socket.

9. An electric cigar lighter comprising a stationary base part; a removable carrier for a heating resistance; a heating resistance mounted upon the carrier, said carrier and resistance forming a self-contained unit; an open-fronted metallic contact socket on the front of the base part, said socket being open at one end and adapted to be connected in an electric circuit; a metallic contact flange on the carrier connected with the heating resistance and adapted to engage the contact socket so that the carrier unit projects through the socket with the heating resistance visible from the front; an electric contact on the base situated within the socket; and a co-operating contact on the back of the carrier unit connected with the heating resistance and adapted to engage with the said contact on the base when the carrier unit is engaged with the socket.

In testimony whereof I have hereunto set my hand.

ALFRED SCHOELLER.